United States Patent
Adair et al.

(10) Patent No.: US 11,868,766 B2
(45) Date of Patent: Jan. 9, 2024

(54) METHOD AND SYSTEM FOR IDENTIFYING DUPLICATE CASCADING STYLE SHEETS (CSS) SELECTOR DECLARATIONS

(71) Applicant: HCL America Inc., Sunnyvale, CA (US)

(72) Inventors: Mitchell Adair, Holly Springs, NC (US); Edward Dunlop, Cary, NC (US); Asiyah Ahmad, Cary, NC (US)

(73) Assignee: HCL America Inc., Sunnyvale, CA (US)

( * ) Notice: Subject to any disclaimer, the term of this patent is extended or adjusted under 35 U.S.C. 154(b) by 121 days.

(21) Appl. No.: 17/694,711

(22) Filed: Mar. 15, 2022

(65) Prior Publication Data
US 2023/0297367 A1   Sep. 21, 2023

(51) Int. Cl.
*G06F 8/71* (2018.01)

(52) U.S. Cl.
CPC ....................... *G06F 8/71* (2013.01)

(58) Field of Classification Search
CPC .......................................................... G06F 8/71
USPC ......................................................... 717/121
See application file for complete search history.

(56) References Cited

U.S. PATENT DOCUMENTS

| 8,745,027 B1 | 6/2014 | Haustein et al. |
| 9,824,075 B1 | 11/2017 | Gross |
| 2007/0240041 A1 | 10/2007 | Pearson |
| 2018/0357055 A1* | 12/2018 | Apte .................. G06F 8/51 |

FOREIGN PATENT DOCUMENTS

| CN | 109669870 A | 4/2019 |
| CN | 105989126 B | 10/2019 |

OTHER PUBLICATIONS

Davood Mazinanian; Eliminating Code Duplication in Cascading Style Sheets; Aug. 2017; pp. 1-144.

* cited by examiner

*Primary Examiner* — John Q Chavis

(57) ABSTRACT

This disclosure relates to method and system for identifying duplicate Cascading Style Sheets (CSS) selector declarations in CSS code bases. The method includes receiving at least one updated CSS code file in a CSS code base from a user. For each of the plurality of selector declarations, the method further includes identifying one or more locations associated with a selector declaration in each of the plurality of CSS code files of the CSS code base in real time. For each of the plurality of selector declarations, the method further includes generating a set of selector locations in each of the plurality of CSS code files. For each of the plurality of selector declarations, the method further includes determining a number of elements in the set of selector locations corresponding to the selector declaration.

20 Claims, 5 Drawing Sheets

METHOD AND SYSTEM FOR IDENTIFYING DUPLICATE CASCADING STYLE SHEETS (CSS) SELECTOR DECLARATIONS

TECHNICAL FIELD

This disclosure relates generally to Cascading Style Sheets (CSS) code management, and more particularly to method and system for identifying duplicate CSS selector declarations in CSS code bases.

BACKGROUND

In coding projects involving multiple developers, conflicts are common when the developers are making contributions simultaneously. Such conflicts, in Cascading Style Sheets (CSS) projects (for example, duplicated selector declarations), do not throw compiler errors and may go unnoticed. Additionally, a CSS code may be reused throughout an application. Sometimes, overriding various style definitions may be necessary for the reused code depending on various use cases. Overrides occurring in multiple places may lead to conflicts.

Conventional methods for identifying conflicts in CSS code files are limited to checking for conflicts in a single code file. However, a development project with multiple developers may include multiple CSS code files. Further, the techniques in the present state of art fail to identify location of the conflicts in a CSS code base.

The conventional techniques fail to provide for efficiently identifying conflicts in CSS code bases. There is, therefore, a need in the present state of art for techniques to identify duplicate selector declarations in CSS code bases in real-time.

SUMMARY

In one embodiment, a method for identifying duplicate Cascading Style Sheets (CSS) selector declarations in CSS code bases is disclosed. In one example, the method includes receiving at least one updated CSS code file in a CSS code base from a user. The CSS code base includes a plurality of CSS code files. The at least one updated CSS code file is one of the plurality of CSS code files. Each of the plurality of CSS code files includes a plurality of selector declarations. For each of the plurality of selector declarations, the method further includes identifying one or more locations associated with a selector declaration in each of the plurality of CSS code files of the CSS code base in real time. Each of the one or more locations includes a file path corresponding to a CSS code file with the selector declaration and a line number corresponding to the selector declaration in the CSS code file. For each of the plurality of selector declarations, the method further includes generating a set of selector locations in each of the plurality of CSS code files. The set of selector locations is an array including the one or more locations associated with the selector declaration. For each of the plurality of selector declarations, the method further includes determining a number of elements in the set of selector locations corresponding to the selector declaration.

In one embodiment, a system for identifying duplicate CSS selector declarations in CSS code bases is disclosed. In one example, the system includes a processor and a computer-readable medium communicatively coupled to the processor. The computer-readable medium store processor-executable instructions, which, on execution, cause the processor to receive at least one updated CSS code file in a CSS code base from a user. The CSS code base includes a plurality of CSS code files. The at least one updated CSS code file is one of the plurality of CSS code files. Each of the plurality of CSS code files includes a plurality of selector declarations. For each of the plurality of selector declarations, the processor-executable instructions, on execution, further cause the processor to identify one or more locations associated with a selector declaration in each of the plurality of CSS code files of the CSS code base in real time. Each of the one or more locations includes a file path corresponding to a CSS code file with the selector declaration and a line number corresponding to the selector declaration in the CSS code file. For each of the plurality of selector declarations, the processor-executable instructions, on execution, further cause the processor to generate a set of selector locations in each of the plurality of CSS code files. The set of selector locations is an array including the one or more locations associated with the selector declaration. For each of the plurality of selector declarations, the processor-executable instructions, on execution, further cause the processor to determine a number of elements in the set of selector locations corresponding to the selector declaration.

In one embodiment, a non-transitory computer-readable medium storing computer-executable instructions for identifying duplicate CSS selector declarations in CSS code bases is disclosed. In one example, the stored instructions, when executed by a processor, cause the processor to perform operations including receiving at least one updated CSS code file in a CSS code base from a user. The CSS code base includes a plurality of CSS code files. The at least one updated CSS code file is one of the plurality of CSS code files. Each of the plurality of CSS code files includes a plurality of selector declarations. For each of the plurality of selector declarations, the operations further include identifying one or more locations associated with a selector declaration in each of the plurality of CSS code files of the CSS code base in real time. Each of the one or more locations includes a file path corresponding to a CSS code file with the selector declaration and a line number corresponding to the selector declaration in the CSS code file. For each of the plurality of selector declarations, the operations further include generating a set of selector locations in each of the plurality of CSS code files. The set of selector locations is an array including the one or more locations associated with the selector declaration. For each of the plurality of selector declarations, the operations further include determining a number of elements in the set of selector locations corresponding to the selector declaration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
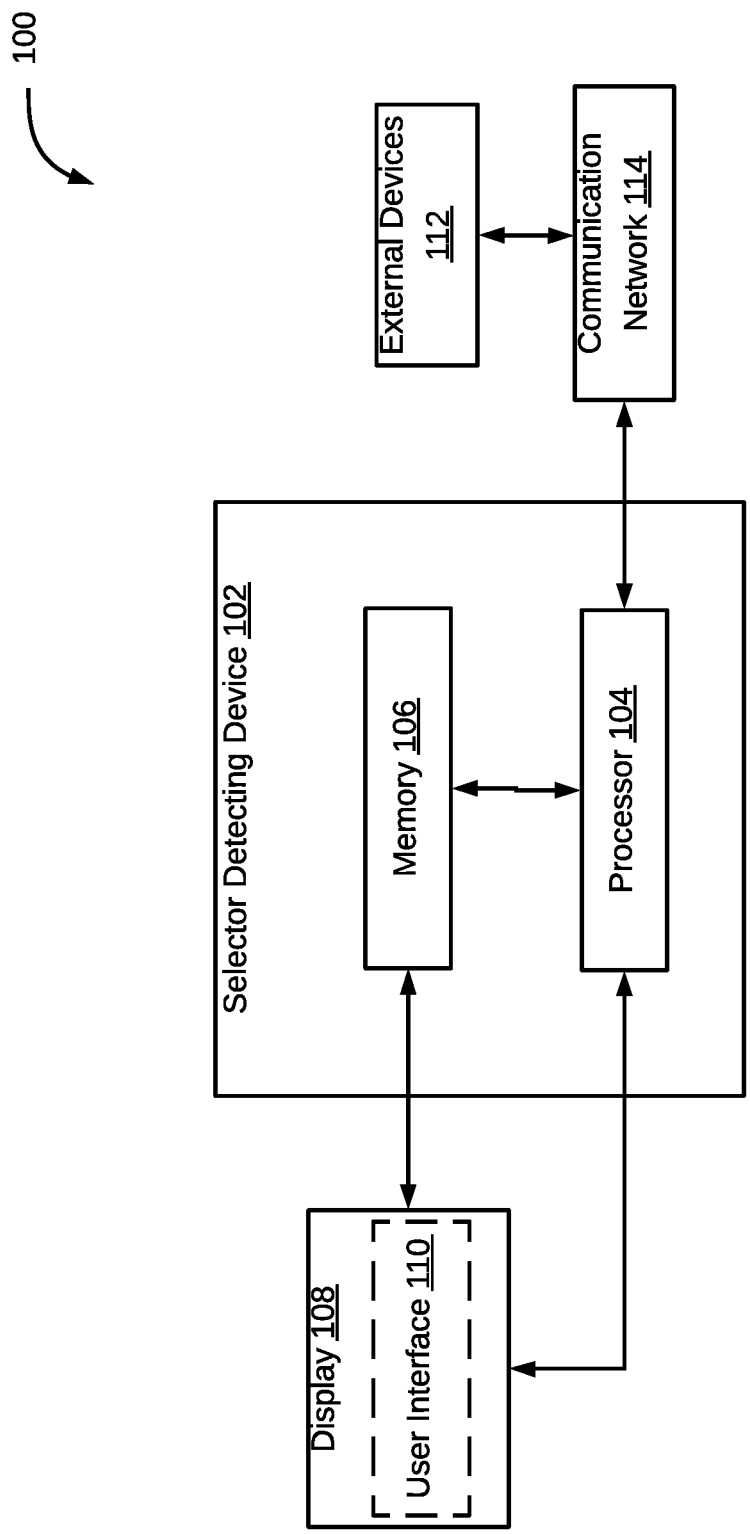
FIG. 1 is a block diagram of an exemplary system for identifying duplicate Cascading Style Sheets (CSS) selector declarations in CSS code bases, in accordance with some embodiments.

Referring now to FIG. 1, an exemplary system 100 for identifying duplicate Cascading Style Sheets (CSS) selector declarations in CSS code bases is illustrated, in accordance with some embodiments. The system 100 may implement a selector detecting device 102 (for example, server, desktop, laptop, notebook, netbook, tablet, smartphone, mobile phone, or any other computing device), in accordance with some embodiments of the present disclosure. The selector detecting device 102 may identify duplicate CSS selector declarations in CSS code bases through an array including one or more locations associated with each of a plurality of selector declarations in a CSS code file.

As will be described in greater detail in conjunction with FIGS. 2-4, the selector detecting device 102 receives at least one updated CSS code file in a CSS code base from a user. The CSS code base includes a plurality of CSS code files. The at least one updated CSS code file is one of the plurality of CSS code files. Each of the plurality of CSS code files includes a plurality of selector declarations. For each of the plurality of selector declarations, the selector detecting device 102 further identifies one or more locations associated with a selector declaration in each of the plurality of CSS code files of the CSS code base in real time. Each of the one or more locations includes a file path corresponding to a CSS code file with the selector declaration and a line number corresponding to the selector declaration in the CSS code file. For each of the plurality of selector declarations, the selector detecting device 102 further generates a set of selector locations in each of the plurality of CSS code files. The set of selector locations is an array including the one or more locations associated with the selector declaration. For each of the plurality of selector declarations, the selector detecting device 102 further determines a number of elements in the set of selector locations corresponding to the selector declaration.

In some embodiments, the selector detecting device 102 may include one or more processors 104 and a memory 106. The memory 106 may include the CSS code base. Further, the memory 106 may store instructions that, when executed by the one or more processors 104, cause the one or more processors 104 to identify duplicate CSS selector declarations in the CSS code base, in accordance with aspects of the present disclosure. The memory 106 may also store various data (for example, CSS code files, set of selector locations in the CSS code files, cache repository data, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the selector detecting device 102 may interact with the one or more external devices 112 over a communication network 114 for sending or receiving various data. The external devices 112 may include, but may not be limited to, a remote server, a digital device, or another computing system.

Figure 2:
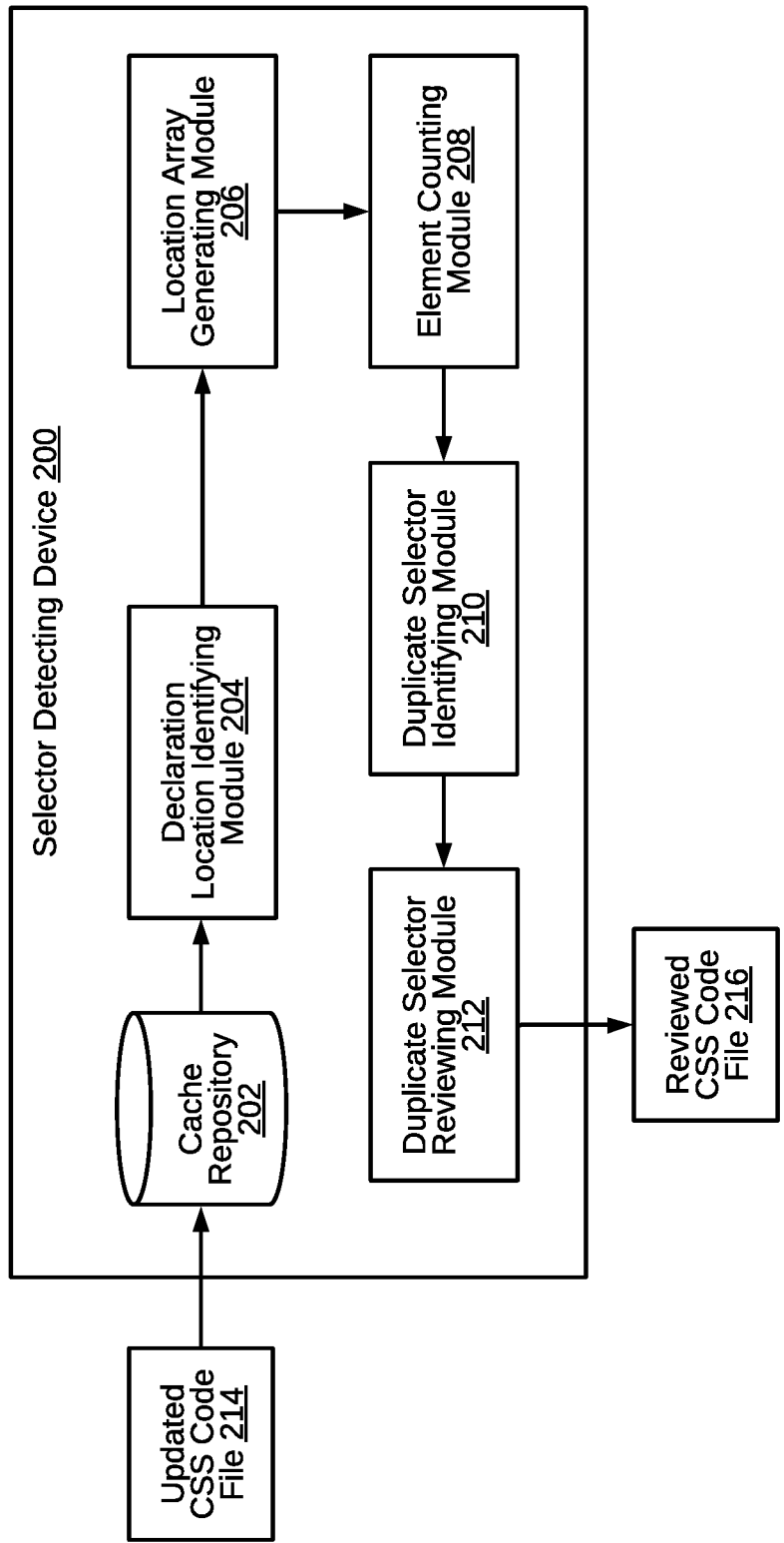
FIG. 2 illustrates a functional block diagram of an exemplary selector detecting device for identifying duplicate CSS selector declarations in CSS code bases, in accordance with some embodiments.

Referring now to FIG. 2, functional block diagram of an exemplary selector detecting device 200 for identifying duplicate CSS selector declarations in CSS code bases is illustrated, in accordance with some embodiments. In an embodiment, the selector detecting device 200 is analogous to the selector detecting device 102 of the system 100. The selector detecting device 200 includes a cache repository 202, a declaration location identifying module 204, a location array generating module 206, an element counting module 208, a duplicate selector identifying module 210, and a duplicate selector reviewing module 212.

The cache repository 202 receives an updated CSS code file 214 from a user. The updated CSS code file 214 may be one of a plurality of CSS code files in a CSS code base. It may be noted that each of the plurality of CSS code files includes a plurality of selector declarations. Upon receiving the updated CSS code file 214 from the user, the cache repository 202 stores the updated CSS code file 214 in real time. Further, the cache repository 202 sends the updated CSS code file 214 to the declaration location identifying module 204.

The declaration location identifying module 204 receives the updated CSS code file 214 from the cache repository 202. Further, for each of the plurality of selector declarations in the updated CSS code file 214, the declaration location identifying module 204 identifies one or more locations associated with a selector declaration in the updated CSS code file 214 in real time. It may be noted that each of the one or more locations includes a file path corresponding to the updated CSS code file 214 with the selector declaration and a line number corresponding to the selector declaration in the updated CSS code file 214. Further, the declaration location identifying module 204 sends the one or more locations associated with each of the plurality of selector declarations in the updated CSS code file 214 to the location array generating module 206.

The location array generating module 206 receives the one or more locations associated with each of the plurality of selector declarations in the updated CSS code file 214 from the declaration location identifying module 204. Further, for each of the plurality of selector declarations, the location array generating module 206 generates a set of selector locations in each of the plurality of CSS code files (including the updated CSS code file 214). The set of selector locations is an array that includes the one or more locations associated with each of the plurality of selector declarations. Further, the location array generating module 206 sends the set of selector locations to the element counting module 208.

The element counting module 208 receives the set of selector locations from the location array generating module 206. Further, for each of the plurality of selector declarations, the element counting module 208 determines a number of elements in the set of selector locations corresponding to the selector declaration. Further, the element counting module 208 sends the number of elements in the set of selector locations to the duplicate selector identifying module 210.

The duplicate selector identifying module 210 receives the number of elements in the set of selector locations from the element counting module 208. Further, for each of the plurality of selector declarations, the duplicate selector identifying module 210 establishes a selector declaration as a duplicated selector declaration when the number of the one or more locations in the set of locations corresponding to the selector declaration is more than one. Further, upon establishing a selector declaration as a duplicated selector declaration, the duplicate selector identifying module 210 displays an error message through an Integrated Development Environment (IDE) terminal of the CSS code base. In an embodiment, the error message includes the file path and the line number corresponding to the duplicated selector declaration. Further, the duplicate selector identifying module 210 sends the error message to the duplicate selector reviewing module 212.

The duplicate selector reviewing module 212 receives the error message from the duplicate selector identifying module 210. Further, for each of the plurality of selector declarations, the user may review, via the duplicate selector reviewing module 212, a selector declaration at each of the set of selector locations in each of the plurality of CSS code files through a user command. Further, for each of the set of selector locations, the user may, via the duplicate selector reviewing module 212, skip the selector location through a user command when the identified duplicate selector declaration is required by the user in the updated CSS code file 214. Alternately, the user may, via the duplicate selector reviewing module 212, update the selector declaration at the selector location through a user command when the identified duplicate selector declaration is not required by the user in the updated CSS code file 214. Further, the duplicate selector reviewing module 212 outputs the reviewed CSS code file 216.

It should be noted that all such aforementioned modules 202-210 may be represented as a single module or a combination of different modules. Further, as will be appreciated by those skilled in the art, each of the modules 202-210 may reside, in whole or in parts, on one device or multiple devices in communication with each other. In some embodiments, each of the modules 202-210 may be implemented as dedicated hardware circuit comprising custom application-specific integrated circuit (ASIC) or gate arrays, off-the-shelf semiconductors such as logic chips, transistors, or other discrete components. Each of the modules 202-210 may also be implemented in a programmable hardware device such as a field programmable gate array (FPGA), programmable array logic, programmable logic device, and so forth. Alternatively, each of the modules 202-210 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying duplicate CSS selector declarations in CSS code bases. For example, the exemplary system 100 and the associated selector detecting device 102 may identify duplicate CSS selector declarations in CSS code bases by the processes discussed herein. In particular, as will be appreciated by those of ordinary skill in the art, control logic and/or automated routines for performing the techniques and steps described herein may be implemented by the system 100 and the selector detecting device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
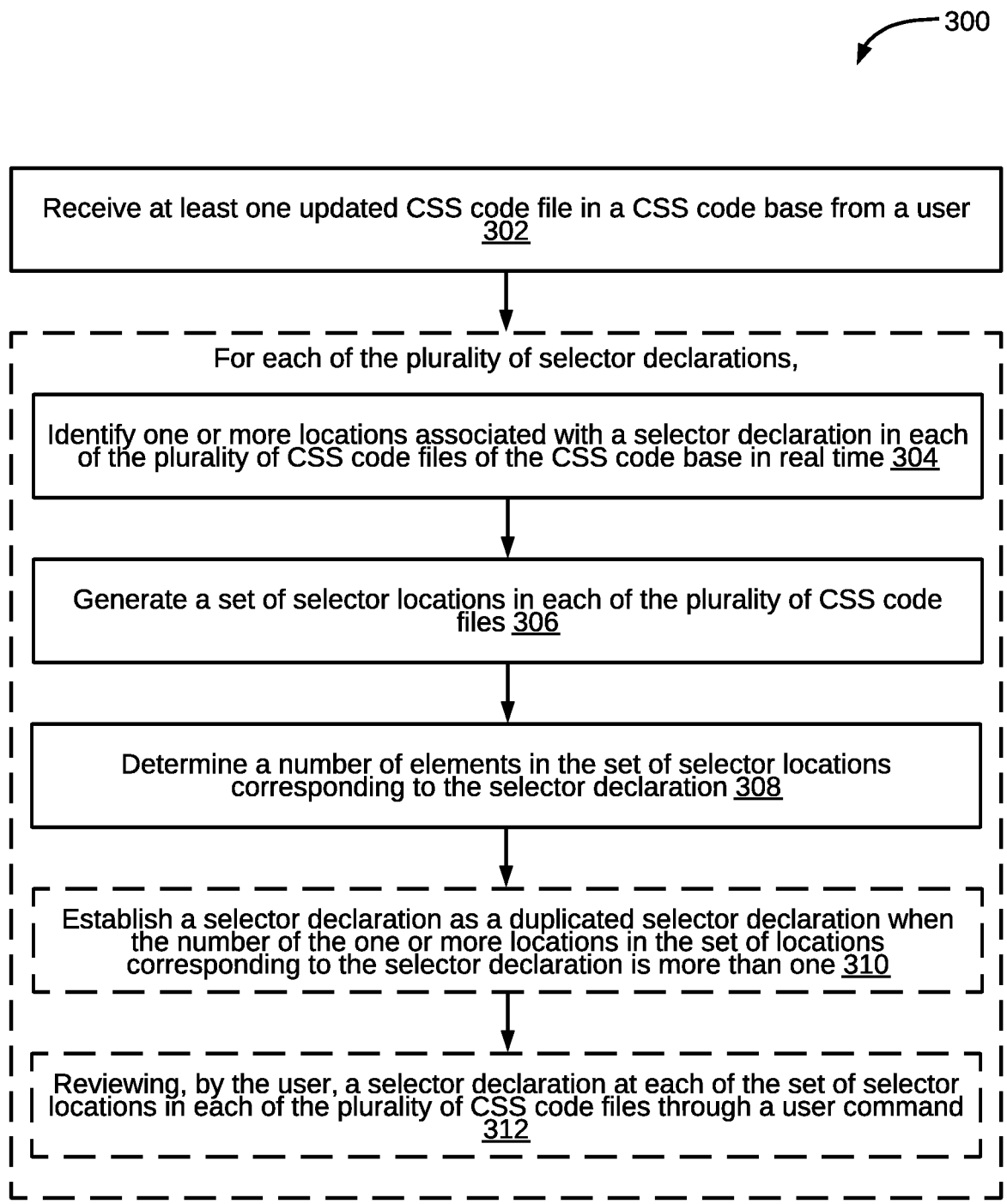
FIG. 3 illustrates a flow diagram of an exemplary process for identifying duplicate CSS selector declarations in CSS code bases, in accordance with some embodiments.

Referring now to FIG. 3, an exemplary process 300 for identifying duplicate CSS selector declarations in CSS code bases is depicted via a flowchart, in accordance with some embodiments. In an embodiment, the process 300 may be implemented by the selector detecting device 102 of the system 100. The process 300 includes receiving at least one updated CSS code file in a CSS code base from a user, at step 302. The CSS code base includes a plurality of CSS code files. The at least one updated CSS code file is one of the plurality of CSS code files. Each of the plurality of CSS code files includes a plurality of selector declarations.

Further, for each of the plurality of selector declarations, the process 300 includes identifying one or more locations associated with a selector declaration in each of the plurality of CSS code files of the CSS code base in real time, at step 304. Each of the one or more locations includes a file path corresponding to a CSS code file with the selector declaration and a line number corresponding to the selector declaration in the CSS code file.

Further, for each of the plurality of selector declarations, the process 300 includes generating a set of selector locations in each of the plurality of CSS code files, at step 306. The set of selector locations is an array including the one or more locations associated with the selector declaration. By way of an example, for each of the plurality of selector declarations in the updated CSS code file 214, the declaration location identifying module 204 identifies one or more locations associated with a selector declaration in the updated CSS code file 214 in real time. Further, the location array generating module 206 generates a set of selector locations in each of the plurality of CSS code files in form of an array.

Further, for each of the plurality of selector declarations, the process 300 includes determining a number of elements in the set of selector locations corresponding to the selector declaration, at step 308. Further, for each of the plurality of selector declarations, the process 300 includes establishing a selector declaration as a duplicated selector declaration when the number of the one or more locations in the set of locations corresponding to the selector declaration is more than one, at step 310. In continuation of the example above, for each of the plurality of selector declarations, the element counting module 208 determines a number of elements in the set of selector locations corresponding to the selector declaration. Further, the duplicate selector identifying module 210 establishes a selector declaration as a duplicated selector declaration when the number of the one or more locations in the set of locations corresponding to the selector declaration is more than one.

Further, for each of the plurality of selector declarations, the process 300 includes reviewing, by the user, a selector declaration at each of the set of selector locations in each of the plurality of CSS code files through a user command, at step 312. It may be noted that for each of the set of selector locations, the user may skip the selector location through the user command when the selector is not a duplicate based on the reviewing. Alternately, for each of the set of selector locations, the user may update the selector declaration at the selector location through the user command. In continuation of the example above, for each of the plurality of selector declarations, the user may review, via the duplicate selector reviewing module 212, a selector declaration at each of the set of selector locations in each of the plurality of CSS code files through a user command. Further, for each of the set of selector locations, the user may, via the duplicate selector reviewing module 212, skip the selector location through a user command when the identified duplicate selector declaration is required by the user in the updated CSS code file 214. Alternately, the user may, via the duplicate selector reviewing module 212, update the selector declaration at the selector location through a user command when the identified duplicate selector declaration is not required by the user in the updated CSS code file 214.

Further, upon establishing a selector declaration as a duplicated selector declaration, an error message is displayed through an IDE terminal of the CSS code base. The error message includes the file path and the line number corresponding to the duplicated selector declaration. Further, each of the at least one updated code file of the CSS code base is stored in a cache repository (such as, the cache repository 202) in real time upon receiving each of the at least one updated code file from the user.

Figure 4:
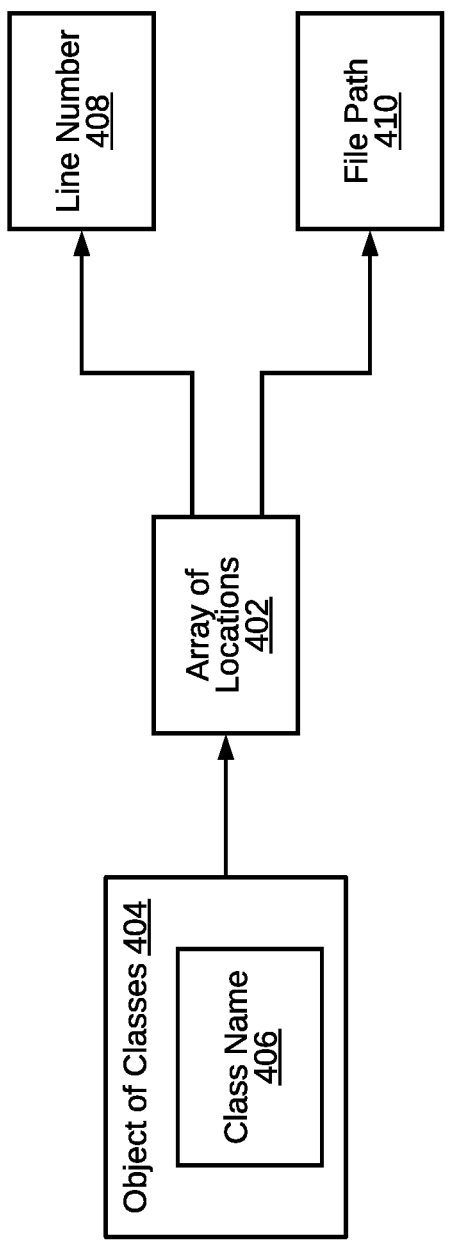
FIG. 4 illustrates generation of an array of locations from an object of classes, in accordance with some embodiments.

Referring now to FIG. 4, generation of an array of locations 402 from an object of classes 404 is illustrated, in accordance with some embodiments. The object of classes may include a plurality of selectors (such as, a class name 406 selector). Further, the location array generating module 206 generates the array of locations 402 from the object of classes 404. The array of locations 402 may include a set of selector locations corresponding to the plurality of selectors. Each of the set of selector locations in the array of locations 402 includes a line number 408 corresponding to a selector declaration in a CSS code file and a file path 410 corresponding to the CSS code file of the CSS code base.

By way of an example, a CSS code file received from a user may include following code:

```
h1 {
    text-align: center;
    color: red;
}
h2 {
    text-align: center;
    color: red;
}
h2 {
    text-align: left;
    color: red;
}
p {
    text-align: center;
    color: red;
}
```

The CSS code file includes a plurality of selector declarations (for example, 'h1', 'h2', and 'p'). The declaration location identifying module 204 identifies one or more locations associated with each of the plurality of selector declarations in the CSS code file in real time. Each of the one or more locations may include a file path corresponding to a CSS code file with the selector declaration and a line number corresponding to the selector declaration in the CSS code file. For example, the line number corresponding to the location associated with the 'h1' selector declaration is 1 and the line numbers corresponding to the locations associated with the 'h2' selector declaration are 6 and 11. The file path for the CSS code file may be <file path>.

Further, the location array generating module 206 generates a set of selector locations in form of an array for the CSS code file. In an embodiment, the set of selector locations for the CSS code file may be [h1: (<file path>, 1), h2: (<file path> (6, 11)), p: (<file path>, 16)]. Further, the element counting module 208 determines a number of elements in the set of selector locations corresponding to the selector declaration. For example, the set of selector locations corresponding to the 'h2' selector includes 2 elements. Further, the duplicate selector identifying module 210 establishes a selector declaration as a duplicated selector declaration when the number of the one or more locations in the set of locations corresponding to the selector declaration is more than one. Since the set of selector locations corresponding to the 'h2' selector includes 2 elements, the duplicate selector identifying module 210 establishes the 'h2' selector as a duplicate. The user may review the 'h2' selector at each of line numbers 6 and 11, and determine whether the h2 selector has been duplicated or required in the CSS code file.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
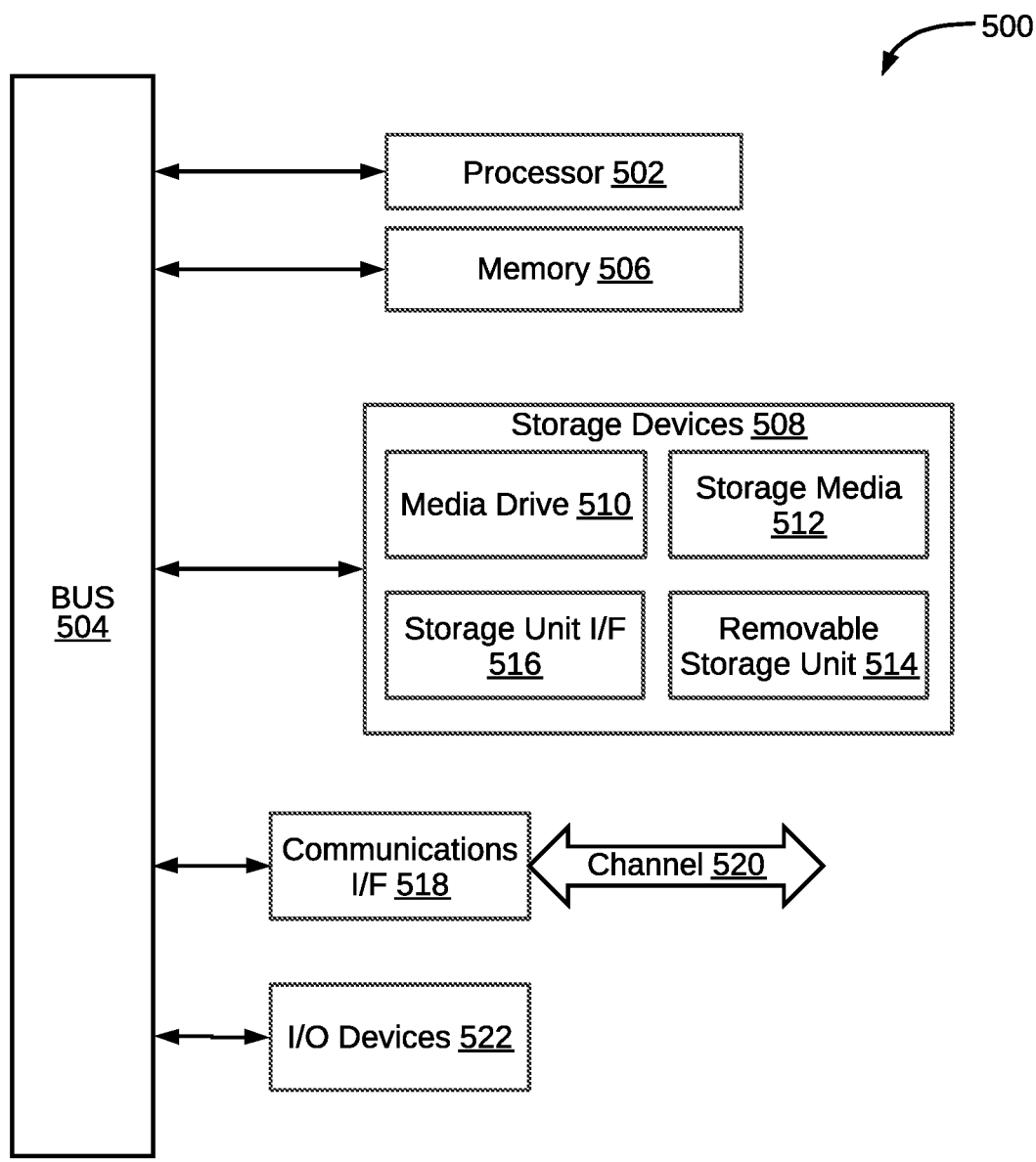
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 502 that may be implemented using a general or special purpose processing engine such as, for example, a microprocessor, microcontroller or other control logic. In this example, the processor 502 is connected to a bus 504 or other communication medium. In some embodiments, the processor 502 may be an Artificial Intelligence (AI) processor, which may be implemented as a Tensor Processing Unit (TPU), or a graphical processor unit, or a custom programmable solution Field-Programmable Gate Array (FPGA).

The computing system 500 may also include a memory 506 (main memory), for example, Random Access Memory (RAM) or other dynamic memory, for storing information and instructions to be executed by the processor 502. The memory 506 also may be used for storing temporary variables or other intermediate information during execution of instructions to be executed by the processor 502. The computing system 500 may likewise include a read only memory ("ROM") or other static storage device coupled to bus 504 for storing static information and instructions for the processor 502.

The computing system 500 may also include a storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by the media drive 510. As these examples illustrate, the storage media 512 may include a computer-readable storage medium having stored therein particular computer software or data.

In alternative embodiments, the storage devices 508 may include other similar instrumentalities for allowing computer programs or other instructions or data to be loaded into the computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from the removable storage unit 514 to the computing system 500.

The computing system 500 may also include a communications interface 518. The communications interface 518 may be used to allow software and data to be transferred between the computing system 500 and external devices. Examples of the communications interface 518 may include a network interface (such as an Ethernet or other NIC card), a communications port (such as for example, a USB port, a micro USB port), Near field Communication (NFC), etc. Software and data transferred via the communications interface 518 are in the form of signals which may be electronic, electromagnetic, optical, or other signals capable of being received by the communications interface 518. These signals are provided to the communications interface 518 via a channel 520. The channel 520 may carry signals and may be implemented using a wireless medium, wire or cable, fiber optics, or other communications medium. Some examples of the channel 520 may include a phone line, a cellular phone link, an RF link, a Bluetooth link, a network interface, a local or wide area network, and other communications channels.

The computing system 500 may further include Input/Output (I/O) devices 522. Examples may include, but are not limited to a display, keypad, microphone, audio speakers, vibrating motor, LED lights, etc. The I/O devices 522 may receive input from a user and also display an output of the computation performed by the processor 502. In this document, the terms "computer program product" and "computer-readable medium" may be used generally to refer to media such as, for example, the memory 506, the storage devices 508, the removable storage unit 514, or signal(s) on the channel 520. These and other forms of computer-readable media may be involved in providing one or more sequences of one or more instructions to the processor 502 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 514, the media drive 510 or the communications interface 518. The control logic (in this example, software instructions or computer program code), when executed by the processor 502, causes the processor 502 to perform the functions of the invention as described herein.

Thus, the disclosed method and system try to overcome the technical problem of identifying duplicate CSS selector declarations in CSS code bases. The method and system may be applied in any application that utilizes CSS to style HTML elements. Further, the method and system may mitigate styling conflicts when multiple developers are making changes to a file at the same time. Further, the method and system may save time and effort spent in a CSS development project.

As will be appreciated by those skilled in the art, the techniques described in the various embodiments discussed above are not routine, or conventional, or well understood in the art. The techniques discussed above provide for identifying duplicate CSS selector declarations in CSS code bases (for example, an application). The techniques first receive at least one updated CSS code file in a CSS code base from a user. The CSS code base includes a plurality of CSS code files. The at least one updated CSS code file is one of the plurality of CSS code files. Each of the plurality of CSS code files includes a plurality of selector declarations. For each of the plurality of selector declarations, the techniques then identify one or more locations associated with a selector declaration in each of the plurality of CSS code files of the CSS code base in real time. Each of the one or more locations includes a file path corresponding to a CSS code file with the selector declaration and a line number corresponding to the selector declaration in the CSS code file. For each of the plurality of selector declarations, the techniques then generate a set of selector locations in each of the plurality of CSS code files. The set of selector locations is an array including the one or more locations associated with the selector declaration. For each of the plurality of selector declarations, the techniques then determine a number of elements in the set of selector locations corresponding to the selector declaration. The techniques provide for an IDE tool that identifies conflicts during development. The IDE tool does not require a running application to be used.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for identifying duplicate CSS selector declarations in CSS code bases. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying duplicate Cascading Style Sheets (CSS) selector declarations in CSS code bases, the method comprising:
   receiving, by a selector detecting device, at least one updated CSS code file in a CSS code base from a user, wherein the CSS code base comprises a plurality of CSS code files, wherein the at least one updated CSS code file is one of the plurality of CSS code files, and wherein each of the plurality of CSS code files comprises a plurality of selector declarations; and
   for each of the plurality of selector declarations,
      identifying, by the selector detecting device, one or more locations associated with a selector declaration in each of the plurality of CSS code files of the CSS code base in real time, wherein each of the one or more locations comprises a file path corresponding to a CSS code file with the selector declaration and a line number corresponding to the selector declaration in the CSS code file;
      generating, by the selector detecting device, a set of selector locations in each of the plurality of CSS code files, wherein the set of selector locations is an array comprising the one or more locations associated with the selector declaration; and
      determining, by the selector detecting device, a number of elements in the set of selector locations corresponding to the selector declaration.

2. The method of claim 1, further comprising, for each of the plurality of selector declarations, establishing a selector declaration as a duplicated selector declaration when the number of the one or more locations in the set of locations corresponding to the selector declaration is more than one.

3. The method of claim 2, further comprising, for each of the plurality of selector declarations, reviewing, by the user, a selector declaration at each of the set of selector locations in each of the plurality of CSS code files through a user command.

4. The method of claim 3, further comprising:
   for each of the set of selector locations, one of,
      skipping the selector location based on the user command; or
      updating the selector declaration at the selector location based on the user command.

5. The method of claim 1, further comprising, upon establishing a selector declaration as a duplicated selector declaration, displaying an error message through an Integrated Development Environment (IDE) terminal of the CSS code base.

6. The method of claim 5, wherein the error message comprises the file path and the line number corresponding to the duplicated selector declaration.

7. The method of claim 1, further comprising storing each of the at least one updated code file of the CSS code base in a cache repository in real time upon receiving each of the at least one updated CSS code file from the user.

8. A system for identifying duplicate CSS selector declarations in CSS code bases, the system comprising:
   a processor; and
   a memory communicatively coupled to the processor, wherein the memory stores processor instructions, which when executed by the processor, cause the processor to:
      receive at least one updated CSS code file in a CSS code base from a user, wherein the CSS code base comprises a plurality of CSS code files, wherein the at least one updated CSS code file is one of the plurality of CSS code files, and wherein each of the plurality of CSS code files comprises a plurality of selector declarations; and
      for each of the plurality of selector declarations,
         identify one or more locations associated with a selector declaration in each of the plurality of CSS code files of the CSS code base in real time, wherein each of the one or more locations comprises a file path corresponding to a CSS code file with the selector declaration and a line number corresponding to the selector declaration in the CSS code file;
         generate a set of selector locations in each of the plurality of CSS code files, wherein the set of selector locations is an array comprising the one or more locations associated with the selector declaration; and determine a number of elements in the set of selector locations corresponding to the selector declaration.

9. The system of claim 8, wherein, for each of the plurality of selector declarations, the processor instructions, on execution, further cause the processor to establish a selector declaration as a duplicated selector declaration when the number of the one or more locations in the set of locations corresponding to the selector declaration is more than one.

10. The system of claim 9, wherein, for each of the plurality of selector declarations, the processor instructions, on execution, further cause the processor to review, by the user, a selector declaration at each of the set of selector locations in each of the plurality of CSS code files through a user command.

11. The system of claim 10, wherein the processor instructions, on execution, further cause the processor to:
for each of the set of selector locations, one of,
skip the selector location based on the user command; or
update the selector declaration at the selector location based on the user command.

12. The system of claim 8, wherein, upon establishing a selector declaration as a duplicated selector declaration, the processor instructions, on execution, further cause the processor to display an error message through an Integrated Development Environment (IDE) terminal of the CSS code base.

13. The system of claim 12, wherein the error message comprises the file path and the line number corresponding to the duplicated selector declaration.

14. The system of claim 8, wherein the processor instructions, on execution, further cause the processor to store each of the at least one updated CSS code file of the CSS code base in a cache repository in real time upon receiving each of the at least one updated code file from the user.

15. A non-transitory computer-readable medium storing computer-executable instructions for identifying duplicate CSS selector declarations in CSS code bases, the computer-executable instructions configured for:
receiving at least one updated CSS code file in a CSS code base from a user, wherein the CSS code base comprises a plurality of CSS code files, wherein the at least one updated CSS code file is one of the plurality of CSS code files, and wherein each of the plurality of CSS code files comprises a plurality of selector declarations; and
for each of the plurality of selector declarations,
identifying one or more locations associated with a selector declaration in each of the plurality of CSS code files of the CSS code base in real time, wherein each of the one or more locations comprises a file path corresponding to a CSS code file with the selector declaration and a line number corresponding to the selector declaration in the CSS code file;
generating a set of selector locations in each of the plurality of CSS code files, wherein the set of selector locations is an array comprising the one or more locations associated with the selector declaration; and
determining a number of elements in the set of selector locations corresponding to the selector declaration.

16. The non-transitory computer-readable medium of claim 15, further comprising, for each of the plurality of selector declarations, establishing a selector declaration as a duplicated selector declaration when the number of the one or more locations in the set of locations corresponding to the selector declaration is more than one.

17. The non-transitory computer-readable medium of claim 16, further comprising, for each of the plurality of selector declarations, reviewing, by the user, a selector declaration at each of the set of selector locations in each of the plurality of CSS code files through a user command.

18. The non-transitory computer-readable medium of claim 17, further comprising:
for each of the set of selector locations, one of,
skipping the selector location based on the user command; or
updating the selector declaration at the selector location based on the user command.

19. The non-transitory computer-readable medium of claim 15, further comprising, upon establishing a selector declaration as a duplicated selector declaration, displaying an error message through an Integrated Development Environment (IDE) terminal of the CSS code base.

20. The non-transitory computer-readable medium of claim 19, wherein the error message comprises the file path and the line number corresponding to the duplicated selector declaration.

* * * * *